Aug. 5, 1941.     H. C. SMITH, JR     2,251,810
FORMING AND TRIMMING MACHINE
Filed Aug. 19, 1938     6 Sheets-Sheet 1

Inventor,
Henry Collier Smith, Jr.
Clarence J. Loftus. Atty

Aug. 5, 1941.　　　H. C. SMITH, JR　　　2,251,810
FORMING AND TRIMMING MACHINE
Filed Aug. 19, 1938　　　6 Sheets-Sheet 2

Witness:
Chas. R. Koursh.

Inventor
Henry Collier Smith, Jr.
Clarence J. Loftus, Atty

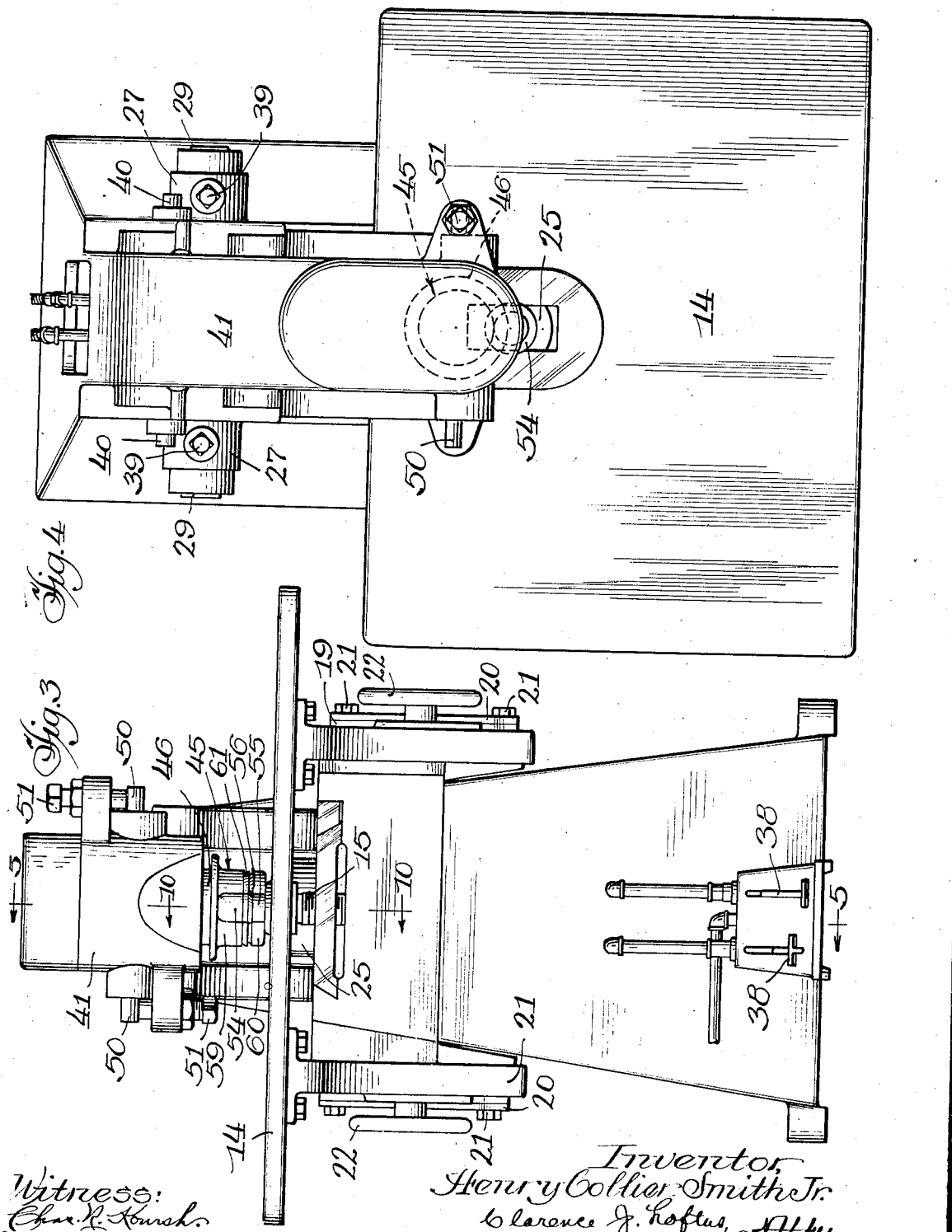

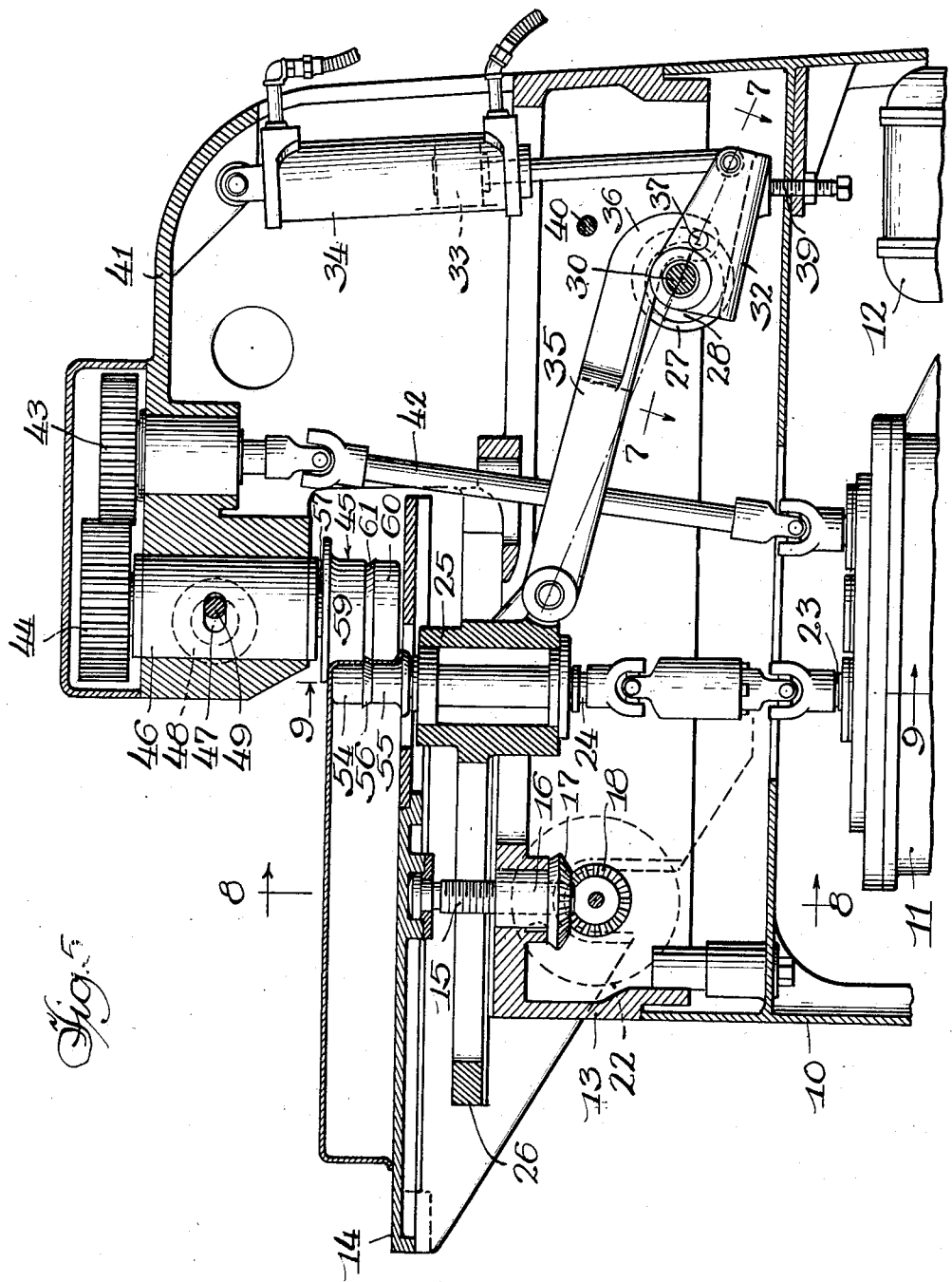

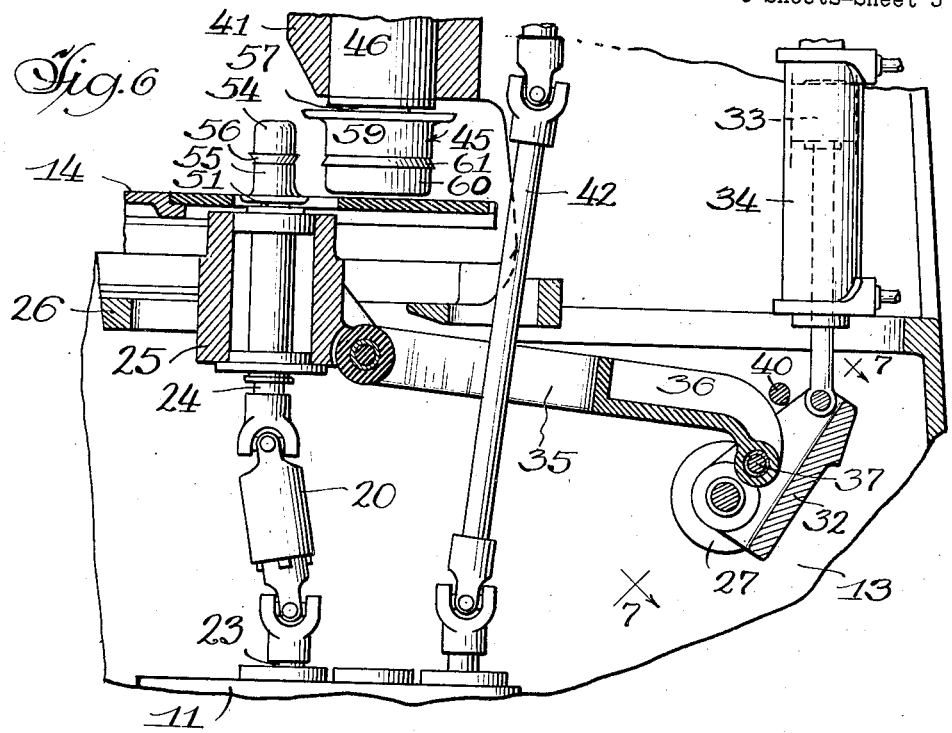

Aug. 5, 1941.          H. C. SMITH, JR                2,251,810
                  FORMING AND TRIMMING MACHINE
                    Filed Aug. 19, 1938           6 Sheets-Sheet 6
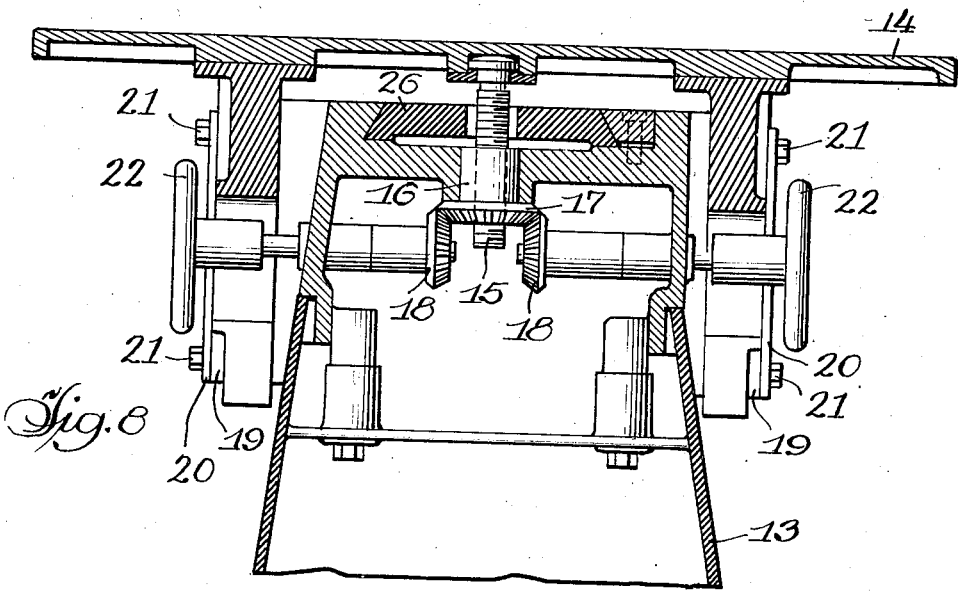
Fig. 8
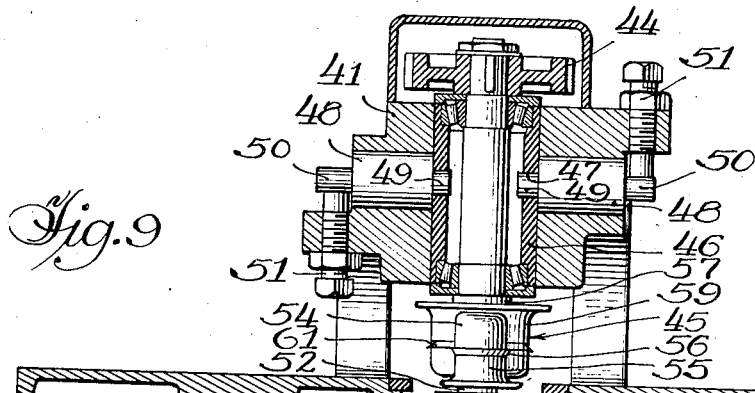
Fig. 9
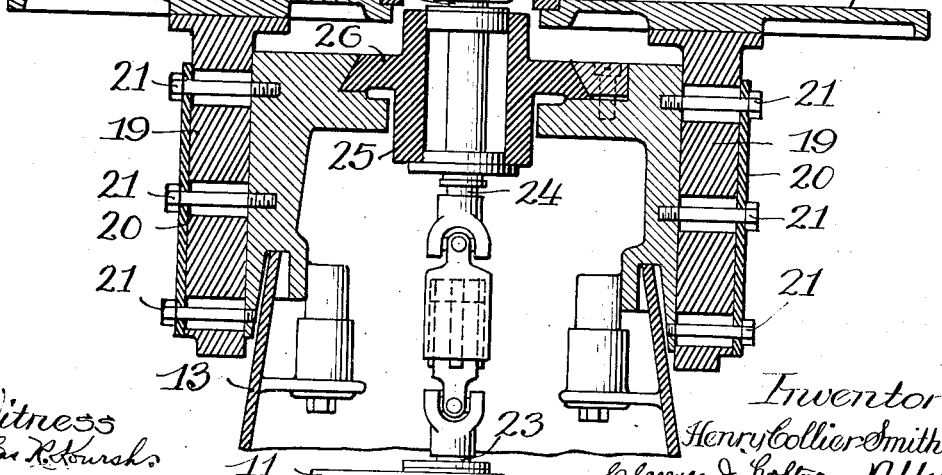
Witness
Chas. R. Koursh
Inventor
Henry Collier Smith Jr.
Clarence J. Loftus, Atty Patented Aug. 5, 1941

2,251,810

UNITED STATES PATENT OFFICE 2,251,810

FORMING AND TRIMMING MACHINE

Henry Collier Smith, Jr., Chicago, Ill., assignor to The Quickwork Company, Chicago, Ill., a corporation of Ohio Application August 19, 1938, Serial No. 225,730

6 Claims. (Cl. 153—2)

My invention relates to a machine for trimming, beading, flanging and forming, not only large, but small stampings without the use of presses and/or dies. Heretofore this work has been done primarily by expensive presses and dies. There has long been a demand for a machine which would do this work without the use of presses and dies. Therefore, I have with my invention, solved this problem by providing a rotary machine which eliminates entirely the use of presses and dies and at the same time produces the results of a press combined with a smooth, clean-cutting action of a rotary shear.

It is a further object of my invention to provide in a device of this kind a self-contained machine which will handle work from a few inches up to several feet in over all dimensions.

Another object is to provide in this machine vertically mounted cooperating rolls in combination with a horizontal table so positioned and arranged to properly support and facilitate the ease of handling the work while formed, stamped and trimmed.

A further object of my invention is to provide in this machine a vertically adjustable work table and a horizontally adjustable but vertically mounted working roll in combination with an overhung vertically mounted and vertically adjustable working roll.

It is a further object to provide means for readily and quickly opening and closing the rolls for loading and unloading the machine.

It is a further object to provide in this machine two independently mounted and driven vertical shafts for the working rolls, one of which shafts is adapted to horizontal adjustment while the other is adapted to vertical adjustment to best accommodate the different work being handled.

The above and other features of novelty, advantages and capabilities will become apparent from a detailed description of the accompanying drawings in which I have illustrated a machine embodying one form of my invention, which is to be understood as illustrative only and not as defining the limits of my invention other than as stated in the appended claims.

In the drawings—

Fig. 3 is a front elevational view.

Fig. 4 is a top plan view.

Fig. 5 is a vertical sectional view with certain parts in elevation, taken substantially on the line 5—5 of Fig. 3, showing the cutting rolls in operative position for cutting or shearing a piece of work.

Fig. 6 is a fragmentary detailed sectional view partially in elevation showing the cutting rolls retracted for loading the machine with a piece of work.

Fig. 7 is a cross sectional detailed view taken substantially on the line 7—7 of Fig. 6.

Fig. 8 is a vertical sectional view taken substantially on the line 8—8 of Fig. 5.

Fig. 9 is a vertical sectional view taken substantially on the line 9—9 of Fig. 5.

Figure 1:
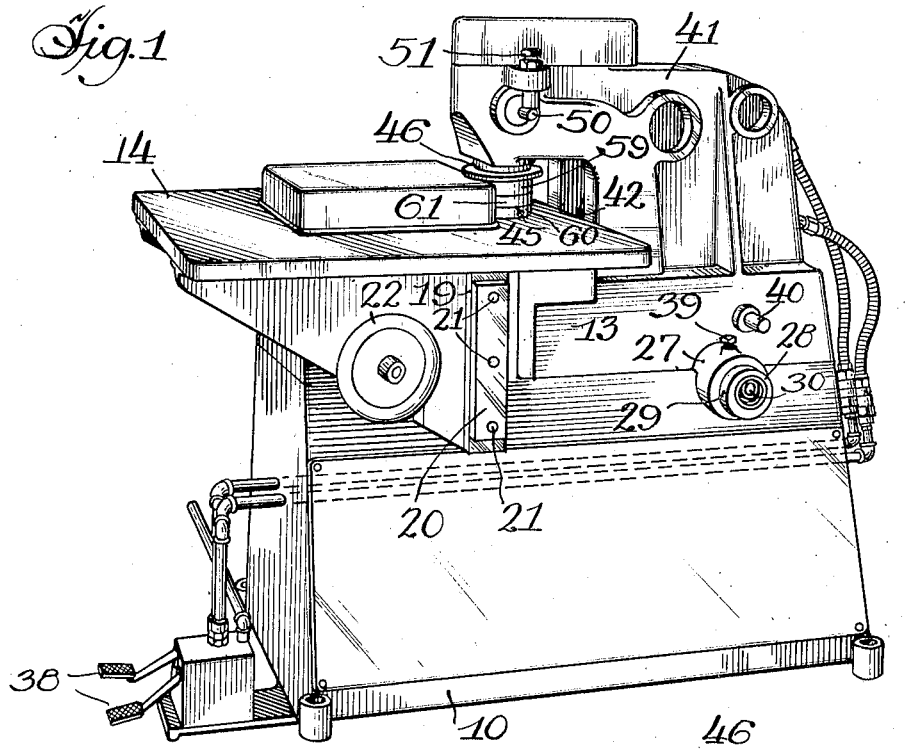
Fig. 1 is a perspective view of a stamping and forming machine embodying one form of my invention showing a piece of work supported on the work table.

Referring to the drawings in detail the machine, as illustrated in the drawings, is provided with a base 10, which may be of cast steel, welded steel or other suitable construction. Mounted in the base 10 is a transmission case 11 for housing suitable driving gears which run in a bath of oil. These gears are driven by an electric motor 12, also mounted in the base 10. Mounted on the upper end of the base 10 is an upper housing 13 consisting of a heavy, rugged semi-steel casting. Supported on and above the housing or casting 13 is a relatively large, horizontally arranged work table 14.

For readily and quickly adjusting this table to best suit the different work being handled by the machine there is connected to the underside of the table, substantially in the center thereof, as best shown in Figs. 5 and 8, by any suitable means, a screw threaded shaft 15 which passes downwardly through a cylindrical, interiorly screw threaded sleeve 16 fixedly mounted in the casting or upper housing 13. On the lower end of the screw threaded shaft 15 is fixed a bevel gear 17 which gear is constantly in mesh with a pair of opposed bevel gears 18. The table is held in horizontal position by means of the slides located at the side of the machine. These slides consist of downwardly extending side members 19 which are secured to the table in any suitable manner by rivets, bolts or the like, and properly held in position on the upper housing 13, as best shown in Fig. 9 by the strips 20 which in turn are secured to the upper housing or casing 13 by the bolts 21. These bolts pass through elongated vertical slots in the members 19. Each of the bevel gears 18 is mounted on horizontal shafts rotatably secured by any suitable means in the upper housing or casing 13. The outer ends of each of these rotary shafts are each provided with a hand-wheel 22 so that the operator standing in front of his machine and operating it can readily and quickly adjust the table to the desired height with either hand by grasping and rotating either hand-wheel. This is a great advantage in the operation of the machine as it permits the operator to make the desired adjustment quickly and easily by whichever hand happens to be free or available at the moment.

Rearwardly of the means for raising and lowering the table I have provided means for mounting the lower roll, means for horizontally adjusting said means and means for effecting the horizontal adjustment which I will now describe.

This mechanism is best shown in Figs. 5, 6 and 9. Suitably connected at one end with the proper gearing in the gear casing is an extensible splined shaft 23. This shaft is operatively connected at its opposite end to the driven shaft 24 for driving the lower forming or cutting roll as the case may be. This driven shaft 24 is rotatably fixed in the casting 25 which is provided with a carriage 26 slidably mounted by any suitable means in the casting 13 so as to slide to and fro horizontally for loading and unloading the machine and for bringing the working rolls into proper working relation and adjustment. The carriage 26 is provided with a longitudinally extending central slot as best shown in Fig. 5, through which the shaft for supporting the turntable extends and which slot permits longitudinal movement of the carriage 26.

Rearwardly of the adjustable mounting for the lower roll heretofore described, the sides of the casing 13 are provided with opposed aligned bosses 27. Positioned in each boss is an eccentric bushing 28, each integrally provided with a flanged collar 29. Extending through these eccentric bushings 28 is a shaft 30 which causes the cam bushings to operate with the shaft by means of a splined connection 31, as best shown in Fig. 7. Rotatably mounted on this shaft 30 between the bushings and within the housing or casing 13 is a lever or bracket 32. The free end of this swinging lever or bracket is pivotally connected to a plunger or piston 33 mounted in a hydraulic cylinder 34 of any suitable construction. This cylinder is operatively connected to a suitable foot treadle mounted near the bottom of the base at the forward side, as best shown in Fig. 1. Pivotally connected to the rearward side of the mounting for the lower roll is a link 35 which extends rearwardly and terminates in a downwardly curved extension 36 provided with a suitable boss or opening and is connected to the lever or bracket 32 by means of a suitable pin 37. When the bracket or lever 32 is swung upwardly the lower roll with its mounting is slid toward the forward end of the machine, thus separating the rolls for unloading or reloading the machine. When the lever or bracket 32 is swung downwardly the lower roll is moved rearwardly into proper cooperating working relation with the upper roll. In order to bring about the movements just described all that the operator need do is step on the foot treadles 38 mounted in the forward end of the base of the machine near the floor. This treadle, through any suitable connection, operates the hydraulic cylinder 34. The arrangement is such that the operator with practically no effort and by merely working the foot treadles can readily and quickly separate the rolls for loading and unloading and readily and quickly bring them together into proper working relation. This is done by pressing one treadle to separate the rolls and the other to bring them into proper working relation. In other words by operating one treadle pressure is admitted below the piston in the hydraulic cylinder to move the plunger in one direction, then by operating the other foot treadle pressure is admitted below the piston in the cylinder to drive the plunger in the reverse direction for moving the bracket or lever 32 in the desired direction. This hydraulic cylinder, its operation and its operating connections being well known and understood in the art need not, it seems, be further described. Moreover, I do not wish to be understood as limited to this mechanism for controlling the operation as various other satisfactory means may be utilized for this purpose.

In the regular, intended operation of the machine the bracket or lever 32 through its connection with the hydraulic cylinder, is moved downwardly a sufficient distance to bring the pivotal connection of the link 35 with the bracket 32 past dead center into locked position, as best shown in Fig. 5. This will be the position of the parts when the cutting or forming rolls are in working relation. In order to limit the downward throw of the bracket 32 just as it passes dead center I provide an adjustable stop 39 which consists of a set screw threaded into the bridging web of the casting or casing 13. By adjusting this stop the operator can thus set the machine for the desired locking position.

In order to better accommodate the machine to various thicknesses of the metal of the work being handled or when the rolls become worn, the throw of the bracket 32 and the longitudinal movement of the link 35 can be varied by adjusting the position of the eccentric bushings 28 in the bosses 27. This is done by unscrewing the set screw 39' and slightly rotating the eccentric bushings 28 with their shaft 30 in the proper direction, thus moving the shaft 30 either slightly forwardly or rearwardly as desired.

To prevent an "over throw" of the lever or bracket 32 when the rolls are moved apart for the purpose of loading or unloading the machine I provide a stop 40 in the path of the upward movement of the bracket 32 which stop is secured in the sides of the casting 13.

Fixed to or formed as a part of the upper housing or casting 13 is an upwardly and forwardly extending support or housing 41 for mounting the upper overhanging forming or cutting roll and its driving connections. The driving shaft 42 is suitably connected at its lower end to its driving gearing in the gear casing and at its upper end to a gear wheel 43 mounted in the housing 41. This gear is constantly in mesh with the relatively wider gear 44. The gear 44, as best shown in Fig. 9, is splined to a suitable shaft for driving the upper cutting or forming roll 45. This shaft is rotatably mounted in the sleeve 46 in any suitable manner and fixed so as to move vertically with the sleeve. The sleeve is provided on opposite sides with slots 47, one of which slots is shown in Fig. 5. Horizontally mounted in the housing 41 are two opposed crank cams 48 which are connected to the slots in the sleeve by pins 49. The cranks 50 of these cams are held in locked position and against movement as best shown in Fig. 9, by means of the set screws 51. When it is desired to adjust, as is frequently necessary when dealing with different work or particularly when the forming or cutting edge becomes worn, the set screws 51 are adjusted to permit the desired movement of the cams and then tightened up to lock the cams in fixed position. This arrangement however is not intended for a wide range of movement. It is only for fine vertical adjustment as may become necessary due to operating conditions.

This adjustment is particularly important for aligning the rolls or cutters in use to bring about the exact and proper working position of the rolls, one with respect to the other, whether cutting or forming.

By providing the upper and forwardly extending member 41 for mounting the mechanism for driving the upper roll above the work table I provide a machine with a throat which thus permits clearance so necessary for handling various size stampings, thus making it possible to trim, bead, flange or handle stamping which otherwise could not be done.

Figure 10:
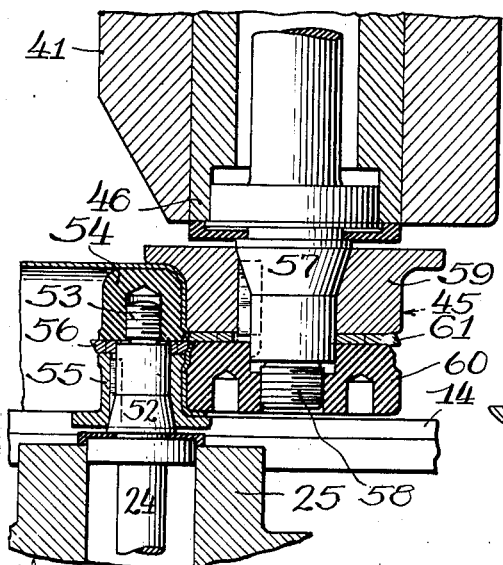
Fig. 10 is an enlarged detailed sectional view showing the device when equipped with cutting rolls with the cutting rolls in working relation and in position for shearing a piece of work, taken substantially on the line 10—10 of Fig. 3.

In Fig. 10 the drive shaft of the lower roll is integrally provided with a cone shaped spindle 52 terminating at its upper end in a screw threaded extension 53. Fitted over the cone shaped spindle 52 and keyed thereto is a forming member 54. Clamped between this member and the forming member 55 is a circular cutting member 56. Likewise the shaft for driving the upper roll is provided with a cone shaped spindle 57 and terminates in a threaded extension 58. It has splined thereto a circular forming member 59. Between the forming member 59 and the forming member 60 there is securely clamped a circular cutting member 61. The member 60 is screw threaded onto the extension 58 of the spindle 57.

Figure 11:
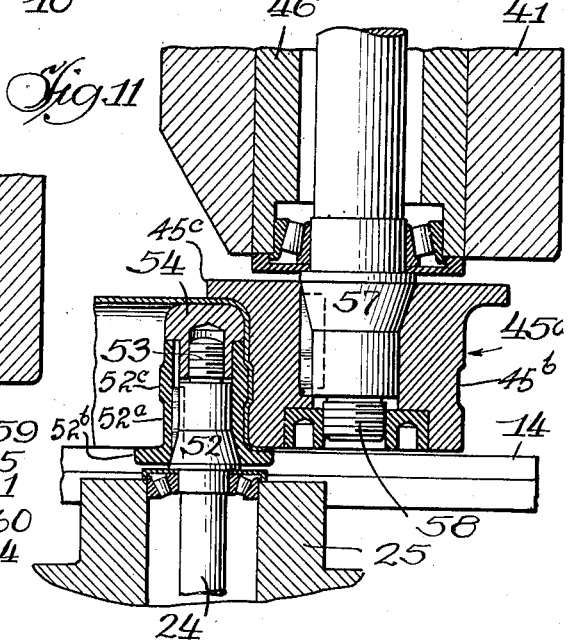
Fig. 11 is a similar view but showing the machine equipped with forming or stamping rolls instead of cutting rolls.
Figure 2:
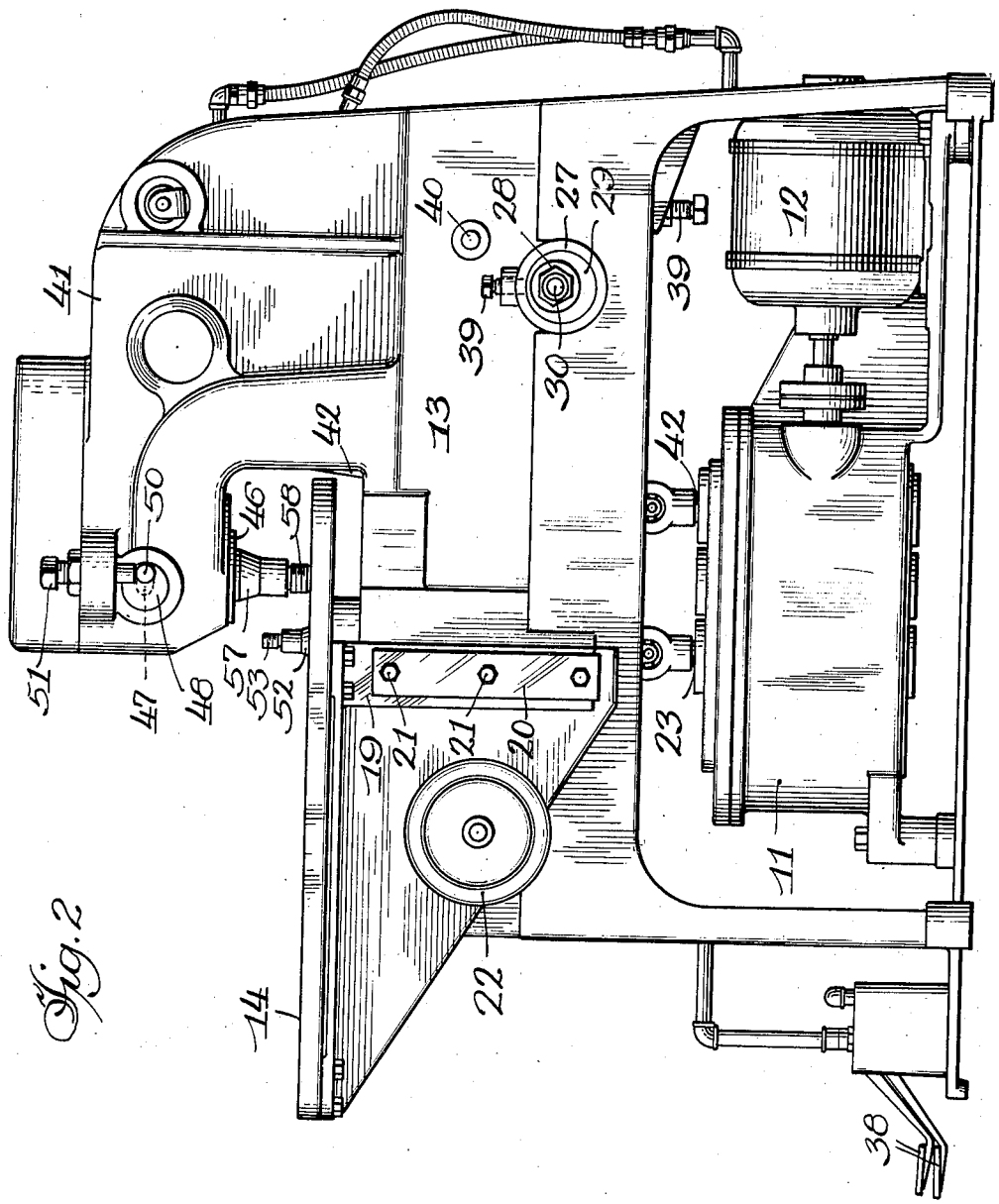
Fig. 2 is a side elevational view showing the working or cutting rolls removed and with one side of the base removed showing the gear casing and motor for driving the gearing mechanism.

In Fig. 11 I have shown my invention having the spindles 52 and 57 equipped with opposed forming rolls for forming a flange and rib on the work to be handled. The spindle 52 is provided with a cylindrical roll 52a which is keyed to and adapted to operate with the spindle 52 and detachably held in place in the same manner as the member 55 heretofore described. The roll 52a is provided with a forming flange 52b and a forming rib 52c. Mounted on the spindle 57 is a flanged forming roll 45a provided with a forming groove 45b adapted to cooperate with the rib 52c arranged in opposed relation thereto and a forming flange 45c arranged to work in opposed relation to the member 54. When the work is inserted in the machine and the rolls 45a and 52a moved into working relation the work is pressed between the two rolls, not only forming the rib on the work but forming a flange on the upper end and the corner on the bottom of the pan or work, as will be readily apparent without further description. The forming of the rib in the work and the flange may well be considered a stamping operation when handling sheet metal work.

Although I have shown a preferred embodiment of my invention it is to be understood as illustrative only and not as defining the limits of my invention except as expressed or intended to be expressed in the appended claims.

Having thus described my invention, I claim:

1. A combined forming and trimming machine comprising in combination a base, a vertically upwardly extending driven shaft, a working roll operatively mounted on said shaft, means for mounting said shaft in said machine for horizontal adjustment, operative means for readily and quickly horizontally adjusting said shaft and working roll, means for varying and fixing the movement of said adjusting means, a horizontally arranged work table, means for readily and quickly adjusting said table vertically, an overhanging, vertically depending driven shaft for driving a working roll for cooperation with said first mentioned working roll, and means for vertically adjusting said last mentioned working roll.

2. In a combined forming and trimming machine comprising a frame work, a vertically arranged upwardly extending driven shaft provided with a working roll on the upper end thereof, means for driving said shaft, a horizontally arranged work supporting table adjacent said working roll and extending in all directions away therefrom, means for readily and quickly vertically adjusting said work table, a supporting member on said frame and extending forward over said work table, a downwardly depending working shaft mounted in said extension and provided at its lower end with a working roll adapted to cooperate with said first mentioned roll, independent means for driving said roll for forming and trimming work positioned between said rolls, means for readily and quickly separating said rolls and reestablishing their working condition for loading and reloading said machine, and means for vertically adjusting said last mentioned working roll.

3. In a combined forming and trimming machine comprising a frame work, a vertically arranged, upwardly extending driven shaft provided with a working roll on the upper end thereof, means for driving said shaft, a horizontally arranged work supporting table adjacent said working roll and extending in all directions away therefrom, means for readily and quickly vertically adjusting said work table, a supporting member on said frame and extending forward over said work table, a downwardly depending driving shaft mounted in said extension and provided at its lower end with a working roll adapted to cooperate with said first mentioned roll, independent means for driving said rolls for forming, stamping and trimming work positioned between said rolls, means for readily and quickly separating said rolls and reestablishing their working condition for loading and reloading said machine, adjustable means for readily and quickly longitudinally moving said first mentioned roll to and from said last mentioned working roll, and means for vertically adjusting said last mentioned working roll.

4. In a combined forming and trimming machine comprising a frame, an upwardly extending driven shaft terminating at its upper end in a cone shaped spindle, a working roll segment interiorly formed to cooperate with said spindle and mounted thereon, a screw threaded extension on said spindle, a second working roll segment secured to said spindle, a cutting roll securely mounted between said segments, means for driving said shaft, a horizontally arranged work table on said frame, an upwardly and forwardly extending supporting member on said frame with its forward portion extending over said work table, a vertically depending driven shaft mounted in said extension and terminating at its lower end in a cone shaped spindle member, a working roll segment interiorly fashioned to cooperate with said cone shaped spindle and mounted thereon, a screw threaded extension fixed to said spindle, a working roll segment secured to said extension, a cutting roll securely mounted between said segments and adapted to cooperate with the first mentioned cutting roll, and means for driving said overhanging, downwardly depending shaft, substantially as and for the purpose set forth.

5. In a combined forming and trimming machine comprising in combination a base, a horizontally arranged work table, an over-hanging vertically depending driven shaft arranged above and over said table, a working roll mounted on the lower end of said depending driven shaft, a vertically upwardly extending driven shaft extending above said table, a working roll mounted thereon above said table and in cooperative opposed relation to said first mentioned roll, means for mounting said last mentioned shaft for horizontal movement of said second working roll with respect to said first mentioned roll, means for readily and quickly and horizontally adjusting said last mentioned shaft and working roll thereon for loading and unloading said machine, and means for readily and quickly vertically adjusting said table as a whole.

6. A combined forming and trimming machine comprising in combination a base, an upwardly, vertically extending driven shaft for driving a working roll, means for mounting said shaft in said machine for horizontal adjustment, operative means for readily and quickly horizontally adjusting said shaft and working roll, a horizontally arranged work table, means for readily and quickly vertically adjusting said table as a whole, an overhanging, vertically depending driven shaft arranged over and above said horizontally arranged and vertically adjustable table for driving a working roll for cooperation with said first mentioned working roll, and means for vertically adjusting said last mentioned working roll.

HENRY COLLIER SMITH, JR.